United States Patent [19]

Hashimoto et al.

[11] Patent Number: 4,534,183

[45] Date of Patent: Aug. 13, 1985

[54] CONTINUOUS FREEZING APPARATUS

[75] Inventors: Masahide Hashimoto; Yoshitaka Kurisu; Shigeo Zuiki; Yoshio Sasaki, all of Nagasaki, Japan

[73] Assignee: Mitsubishi Denki Kabushiki Kaisha, Tokyo, Japan

[21] Appl. No.: 654,026

[22] Filed: Sep. 25, 1984

[30] Foreign Application Priority Data

Sep. 27, 1983 [JP] Japan .................................. 58-181689
Sep. 27, 1983 [JP] Japan .................................. 58-181690
Sep. 27, 1983 [JP] Japan .................................. 58-181691
Apr. 4, 1984 [JP] Japan ............................ 59-50390[U]

[51] Int. Cl.³ .............................................. F25D 17/02
[52] U.S. Cl. ...................................... 62/374; 62/380; 198/628; 198/836
[58] Field of Search .................. 62/63, 380, 341, 374, 62/375; 198/628, 836

[56] References Cited

U.S. PATENT DOCUMENTS

| 3,302,423 | 2/1967 | Morrison | 62/374 |
| 3,664,146 | 5/1972 | Butts | 62/374 |
| 4,186,797 | 2/1980 | Guttinger et al. | 62/380 |

FOREIGN PATENT DOCUMENTS 51-46818 12/1976 Japan .
54-95047 7/1979 Japan .
55-5022 2/1980 Japan .

Primary Examiner—Ronald C. Capossela
Attorney, Agent, or Firm—Oblon, Fisher, Spivak, McClelland & Maier

[57] ABSTRACT

A continuous freezing apparatus is provided with a flexible sheet conveyor arranged above products to be frozen placed on and carried by a steel conveyor so as to be in contact with the products and the flexible sheet conveyor is filled with cold brine, to thereby freeze said products through both upper and lower surfaces of contact. The width of the track of the flexible sheet is determined in such a manner that the track width is made substantially equal to the width of the flexible sheet at its turning areas where the flexible sheet does not in contact to the products and the track width is made narrow to the extent that a depressed slack sufficient to fill therein the cold brine is formed in the flexible sheet at a position where the flexible sheet is in contact with said products.

7 Claims, 21 Drawing Figures

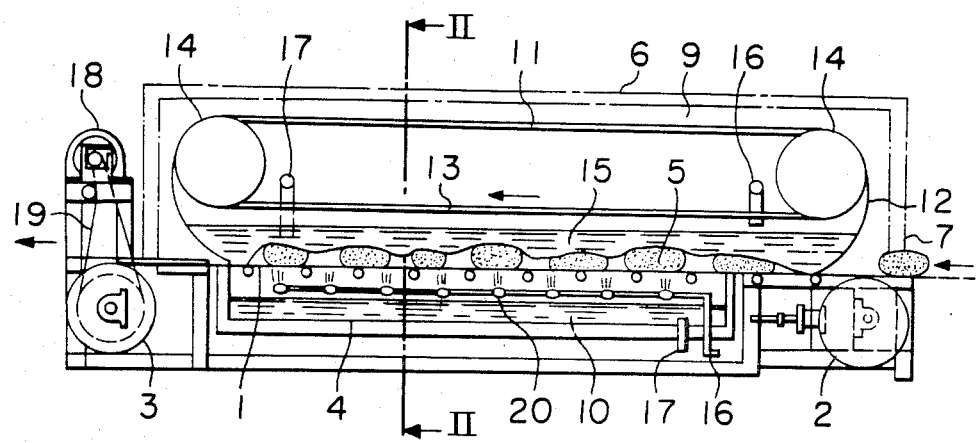
FIGURE 1
FIGURE 2
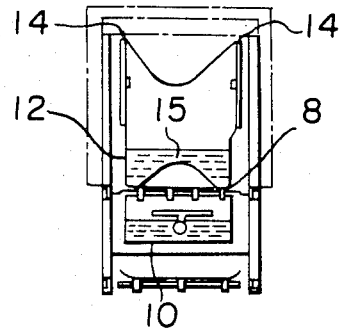
FIGURE 3
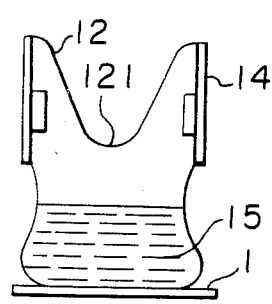
FIGURE 4
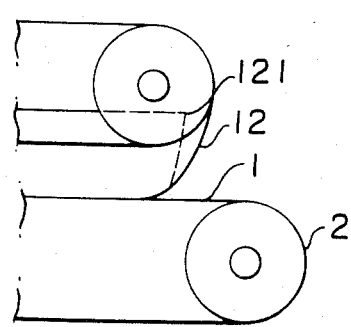
FIGURE 5
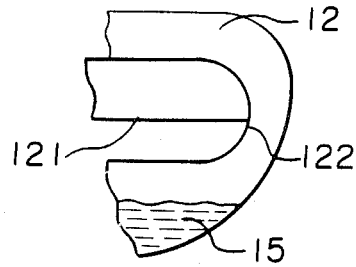

4,534,183

CONTINUOUS FREEZING APPARATUS

BACKGROUND OF THE INVENTION

The present invention relates to a continuous freezing apparatus utilizing a belt conveyor.

There has so far been proposed a continuous freezing apparatus as shown in FIGS. 1 and 2. In the figures, a reference numeral 1 designates a steel belt; a numeral 2 a tension pulley for imparting a tension to the steel belt 1; a numeral 3 a driving pulley for driving the steel belt 1; a numeral 4 a brine tank equipped with an injection nozzle for injecting cold brine 10 to the steel belt 1; a numeral 5 products to be frozen; a numeral 11 a flexible sheet conveyor; a numeral 13 a pair of conveyor chains to which the flexible sheet is attached; a numeral 14 a pair of sprockets for rotating the conveyor chains 13; a numeral 15 cold brine filled in the flexible sheet 12; numerals 16 designate inlets for cold brine through which the cold brine is introduced in the brine tank 4 and the flexible sheet 12; numerals 17 outlets for the cold brine; a numeral 18 designates a driving motor for the steel belt 1; 19 a chain for transmitting revolutional force of the driving motor to the driving pulley 3 for the steel belt 1 and a numeral 6 a heat-insulating tunnel surrounding the flexible sheet conveyor 11.

The operation of the conventional continuous freezing apparatus will be described.

Products 5 to be frozen are introduced through a product supplying opening 7 to be placed on the steel belt 1 and are fed to a freezing zone 9 in the heat-insulating tunnel 6. In the freezing zone 9, the products 5 to be frozen are subjected to freezing effect from the lower side through the steel belt 1 by the cold brine 10 injected from the nozzle 20 in the brine tank 4. At the same time, they are subjected to freezing effect by the cold brine 15 held in the flexible sheet conveyor 11 through the flexible sheet 12. Then, the frozen products are transferred to the next steps through an outlet 8.

The steel belt 1 is driven by the driving pulley 3 through the chain 19 which is, in turn, driven by the driving motor 18. Since the flexible sheet 12 is in contact with the steel belt 1 and the products 5 to be frozen, on the steel belt 1, the flexible sheet conveyor 11 is driven due to frictional force generated between the flexible sheet 12 carrying therein the cold brine 15 and the steel belt 1 or the products 5, on account of which a continuous rotating movement of the flexible sheet 12 is effected by the conveyor chain 13 to which the flexible sheet 12 is attached and the sprockets 14. The cold brine 10 in the brine tank 4 and the cold brine 15 in the flexible sheet 12 are supplied from the cold brine inlets 16 and are discharged through the cold brine outlets 17 to be circulated through a brine receiver installed out of the apparatus.

In the conventional flexible sheet conveyor constructed as above-mentioned, when the flexible sheet 12 is turned around the sprockets 14, a sharp wrinkle 122 is formed in the central portion 121 of the flexible sheet 12 shown in FIGS. 3 through 5 because a convex surface and a concave surface of the flexible sheet 12 reversed at the end position shown in FIG. 5 and in addition, the flexible sheet 12 is subjected to a tension due to the cold brine 15, whereby the flexible sheet 12 is worn to cause its breakage.

SUMMARY OF THE INVENTION

It is an object of the present invention to eliminate the disadvantage of the conventional apparatus and to provide a continuous freezing apparatus constructed in such a manner that the width of the track of a flexible sheet is made narrow for a predetermined portion to avoid formation of a sharp wrinkle when the flexible sheet is rotated.

The foregoing and the other objects of the present invention have been attained by providing a continuous freezing apparatus provided with a flexible sheet conveyor arranged above products to be frozen placed on and carried by a steel conveyor so as to be in contact with the products, the flexible sheet conveyor being filled with cold brine, to thereby freeze the products through both upper and lower surfaces of contact, the continuous freezing apparatus being characterized in that the width of the track of the flexible sheet is determined in such a manner that the track width is made substantially equal to the width of the flexible sheet at its turning areas where the flexible sheet does not contact to the products and the track width is made narrow to the extent that a depressed slack sufficient to fill therein the cold brine is formed in the flexible sheet at a position where the flexible sheet is in contact with the products.

A more complete appreciation of the invention and many of the attendant advantages thereof will be readily obtained as the same becomes better understood by reference to the following detailed description when considered in connection with the accompanying drawing, wherein:

BRIEF DESCRIPTION OF THE DRAWINGS

FIG. 1 is a front view partly cross-sectioned of a conventional continuous freezing apparatus;

FIG. 2 is a cross-sectional view taken along the line II—II in FIG. 1;

FIGS. 3, 4 and 5 are schematic views showing behavier of the conventional apparatus;

DETAILED DESCRIPTION OF THE PREFERRED EMBODIMENTS

Figure 6:
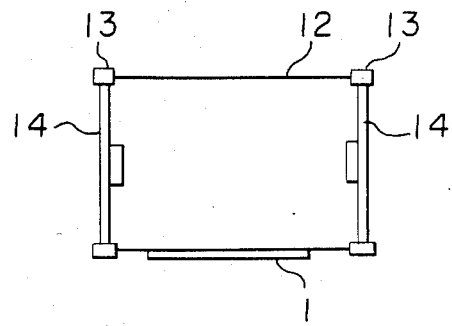
FIG. 6 is a schematic side view of an important part of an embodiment of the continuous freezing apparatus according to the present invention.

Preferred embodiment of the present invention will be described with reference to drawing. In the drawing, the same reference numerals designate the same or corresponding parts.

Figure 7:
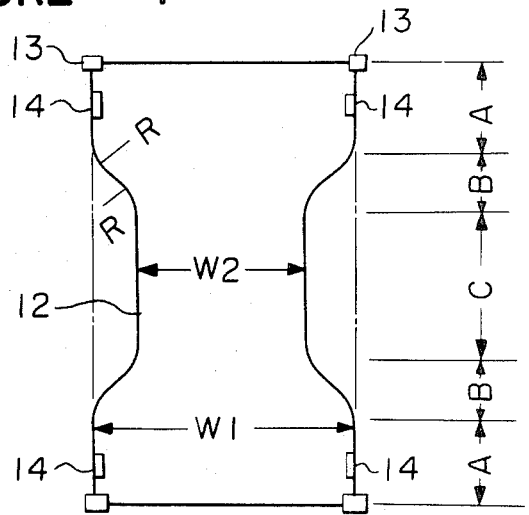
FIG. 7 is a plane view of the lower part of a flexible sheet of the present invention.
Figure 8:
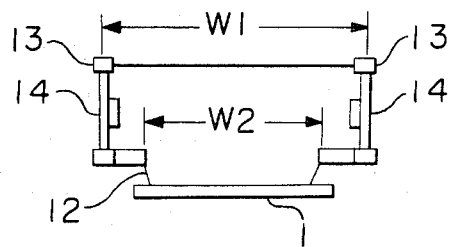
FIG. 8 is a schematic view in cross section of the continuous freezing appparatus of the present invention.
Figure 9:
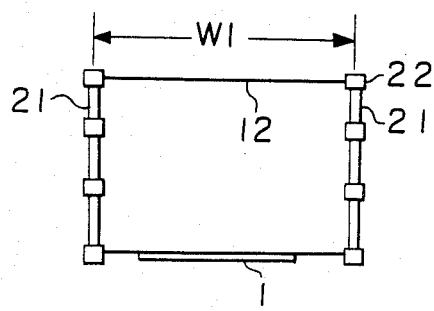
FIG. 9 is a schematic side view of an important part of the second embodiment of the continuous freezing apparatus according to the present invention.

FIGS. 6, 7 and 8 show the first embodiment of the continuous freezing apparatus of the present invention. In the Figures, sprockets 14 are supported so that they have the same width as that of the flexible sheet 12.

In FIG. 7 a plan view of the lower part of the flexible sheet 12 as shown in FIG. 6, the flexible sheet 12 is held and moved in such a manner that when the chains 13 move the upper portion of the sprockets 14, the chains 13 keep the width W1 which is same as that of the flexible sheet 12; when the chains 13 move at the lower part of the sprockets and along a portion of length A extending contiguous to the sprockets, they keep the width W1 which is the same or substantially the same as that of the flexible sheet 12; they keep the width W2 in the central portion C where the flexible sheet 12 comes in contact with the products to be frozen, the width W2 being the same as the width of the flexible sheet in this portion in the conventional apparatus; and at the intermediate portion B, the track of the chains 13 becomes narrow from the width W1 to the width W2 according to the radius of curvature R so that the track of the chains is smoothly changed. It has been well known that although the flexible sheet 12 rotates without causing a wrinkle in the track as shown in FIG. 6, it can not store the cold brine 15 unlike the conventional apparatus. In the flexible sheet 12 moving along the track shown in FIGS. 7, 8, however, the flexible sheet 12 keeps its width W1 at the upper portion of the sprockets 14 as well as the portion indicated by the letter A. Accordingly, no sharp wrinkle is formed even when the flexible sheet 12 moves from the portion B to the portion C. There causes no reversion between the convex and concave surfaces as seen in the conventional apparatus and accordingly, the shape of a wrinkle is smooth even if it is formed.

In the above-mentioned embodiment, description has been made as to the flexible sheet 12 attached to the chains 13. A transferring means other than chains can be used as far as factors of W1, W2, A, B, C and R are same as above-mentioned since the shape of the track is significant in the present invention.

In the embodiment of the present invention, the track restricting the flexible sheet is so constructed that it is changed in a plane whereby a sharp wrinkle is not formed in the flexible sheet and the life time of the flexible sheet is prolonged.

Figure 12:
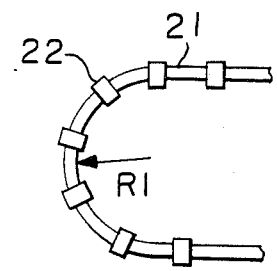
FIG. 12 is a front view of a part of a guide rail according to the second embodiment.
Figure 10:
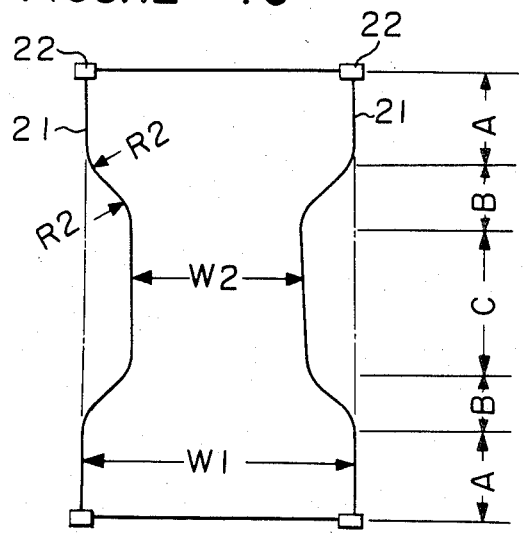
FIG. 10 is a plane view of the lower part of the flexible sheet according to the present invention.
Figure 11:
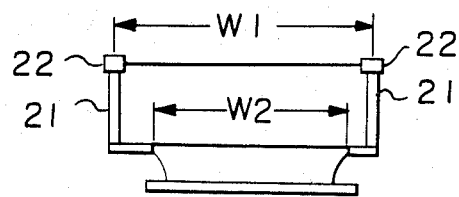
FIG. 11 is a schematic view in cross section of the apparatus shown in FIG. 9.

A second embodiment of the present invention will be described with reference to FIGS. 9 to 15. A pair of rod-like guide rails 21 are supported to have substantially the same width as the width of the flexible sheet 12. In the plan view of FIG. 10, the guide rails 21 keep the same width W1 as that of the flexible sheet 12 at the opposite side of the steel belt 1, namely the upper portion in FIG. 9 and also the guide rails 21 keep the same width W1 as the flexible sheet 12 in the rotating portion (the transitional portion from the upper portion to the lower portion) as shown in FIG. 12, the rotating portion having a radius of curvature R1. The guide rails 21 keep substantially the same width as that of the flexible sheet 12 at the lower portion extending at the length A which is 2 times or more than the radius R1 and keep the width W2 which is narrower than the width W1 at the lower central portion C where the flexible sheet 12 is in contact with the products to be frozen. In the intermediate portion B, the guide rails 21 have their tracks such that the width is narrowed from the width W1 to the width W2 in accordance with the radius of curvature R2 so that the guide rails are changed smoothly.

Figure 13:
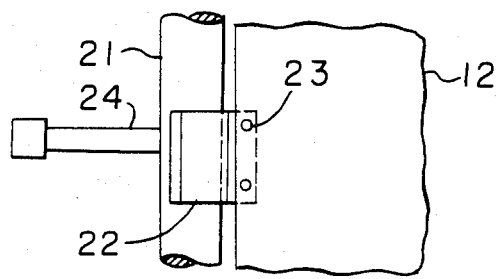
FIGS. 13, 14 and 15 are schematic views showing states of connection between the flexible sheet and the guide rail.
Figure 14:
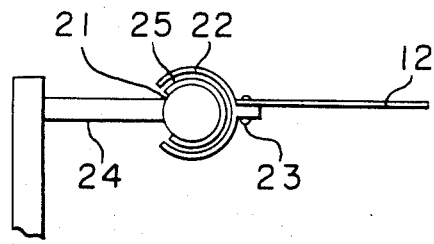
Figure 15:
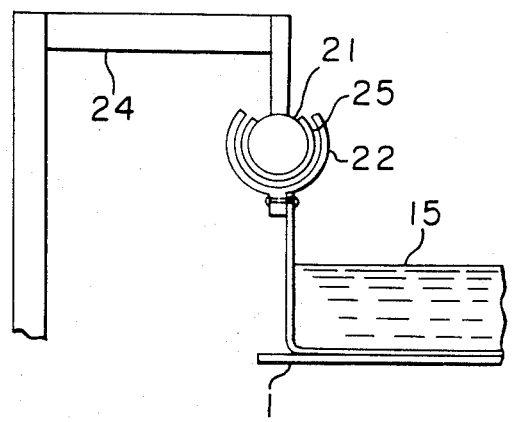

FIGS. 13 to 15 show how the flexible sheet 12 is connected to each of the guide rails 21. The FIGS. 13 and 14 show a state of connection to the upper guide rail and FIG. 15 shows a state of connection to the lower guide rail.

In FIG. 13, the flexible sheet 12 is attached to a plurality of adapters 22 by means of fixtures 23. Each of the adapters 22 is fitted to the guide rail 21. As shown in FIG. 14, a linear bearing 25 is placed inside each of the adapter 22. As shown in FIGS. 14 and 15, the guide rail 21 is supported by a supporter 24 so as not to prevent movement of the flexible sheet 12.

With the construction of the second embodiment as above-mentioned, formation of the wrinkle can be prevented as in the first embodiment.

The adapter 22 is formed as a letter C in cross section and an open type linear bearing 25 is fitted in the adapter 22. Accordingly, connection of the flexible sheet 12 to the guide rail 21 is facilitated and support of the guide rail 21 can be easily done.

In the embodiment as described above, description has been made as to combination of guide rails 21 made of round rod material and the adapters 22 each provided with a linear bearing 25. It is, however, possible to use a rod-like body other than round rod as the guide rail 21 as far as it allows easy fabrication of the track and it is rotatable and slidable on the track.

As described above, in the second embodiment, the adapters for suspending of the flexible sheet are slidably fitted to rod-like guide rails through the linear bearing and the track of the guide rails is changed in a plane whereby a sharp wrinkle is not produced in the flexible sheet to thereby prolong the life time of the flexible sheet. Further, no unreasonable stress is applied to the flexible sheet and support of the guide rails is facilitated.

Figure 16:
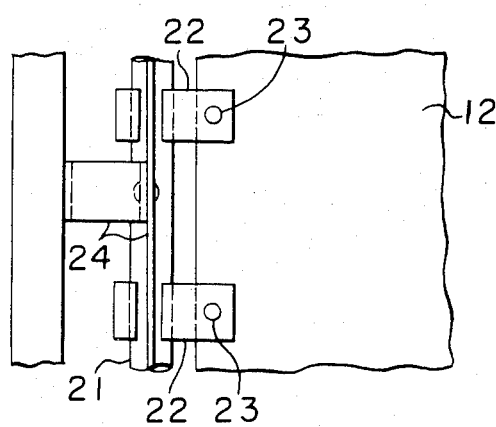
FIGS. 16, 17 and 18 are schematic views showing states of connection between the flexible sheet and the guide rail according to the third embodiment of the present invention.
Figure 17:
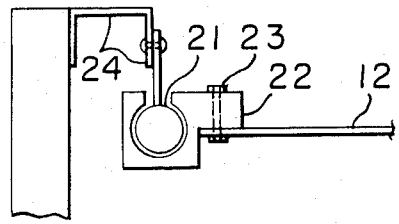
Figure 18:
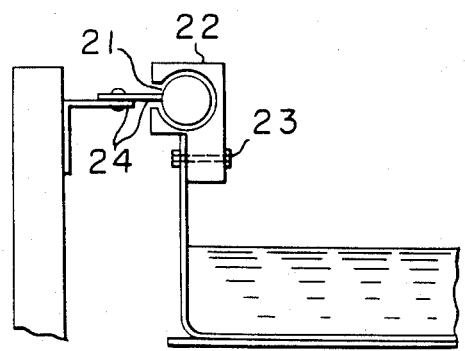

FIGS. 16 to 18 show another embodiment of combination of guide rails and adapters.

In FIG. 16, the flexible sheet 12 is connected to a plurality of the adapters 22 by means of the fixture 23. The adapters 22 are fitted in the guide rail 21. Each of the adapters 22 is made of synthetic resinous material having a small coefficient of friction. The guide rail 21 is supported by the supporter 24 from the direction so as not to prevent the movement of the flexible sheet 12 as shown in FIG. 17 or 18. Thus, since the adapter 22, having an opening, made of synthetic resinous material is used, connection of the guide rail 21 to the flexible sheet 12 is facilitated and support of the guide rail 21 can be easy.

In the embodiment as described above, description has been made as to combination of the guide rail 21 made of round rod material and the adapter 22 made of synthetic resinous material having a small coefficient of friction; however, it is possible to use material other than synthetic resin if the material has a small coefficient of friction for the contacting surface to the guide rail. It is not critical to use the round rod-like guide rail if it is a rod-like body having an excellent sliding property. Further, the life time of the adapter 22 can be prolonged by constituting the sliding surface of the adapter by an oilless slide-bearing.

In accordance with the embodiment described above, in addition to the advantage of eliminating formation of a sharp wrinkle in the flexible sheet and easiness of supporting the guide rail, use of a material having a small coefficient of friction reduces noises generated between the adapter and the guide rail during sliding movement of the adapter and prolongs the life time of the adapter due to its corrosion resistance property.

Figure 19:
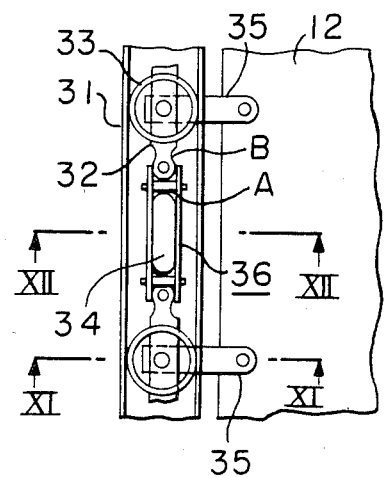
FIG. 19 is an enlarged view showing the detail of the guide rail according to another embodiment of the present invention.
Figure 20:
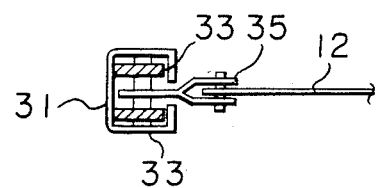
FIGS. 20 and 21 are respectively cross-sectional views taken along the lines XI—XI, XII—XII in FIG. 19.
Figure 21:
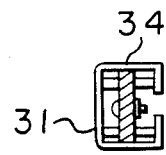

FIGS. 19 to 21 show still another embodiment of the connection of the guide rail 31 to the flexible sheet 12. The guide rail is in a channel shape having a reduced opening in cross section.

Rotating pins which cross perpendicular to each other are received in the guide rail 31 and rollers 33 and 34 are fitted to the rotating pins so that the rollers 33, 34 are guided by the guide rail 31. Around both pins A, B a chain 33 is assembled in a freely rotatable manner and the flexible sheet 12 is attached to a fixture 35 connected to the rotating pin of the roller 33 as shown in FIG. 20.

The chain 33 is placed between the rotating pins crossing perpendicular to each other and is engaged therewith. A roller chain 36 is constituted by the rollers 33 fitted to the rotating pins whereby the roller chains 36 moves smoothly in the guide rail 31. The construction as above-mentioned facilitates support of the guide rail.

In the embodiment described above, combination of the guide rail 31 and the chain 32 having the fixture 35 is used. However, the same effect can be attained as far as the track for the flexible sheet can be easily fabricated and the flexible sheet is rotatable and slidable on the track.

In this embodiment, a chain capable of rotating in two directions in the guide rail is used. Accordingly, no unreasonable force is applied to the flexible sheet and support of the guide rail can be easily done.

Obviously, numerous modifications and variations of the present invention are possible in light of the above teachings. It is therefore to be understood that within the scope of the appended claims, the invention may be practiced otherwise than as specifically described herein.

We claim:

1. A continuous freezing apparatus comprising:

a belt conveyor for carrying products to be frozen along a path;

a flexible sheet conveyor arranged above and parallel to said belt conveyor, said flexible sheet conveyor being formed of a continuous flexible sheet having upper and lower paths and a constant width, and means for filling said flexible sheet with cold brine, whereby a portion of said flexible sheet contacts said products;

means for moving said flexible sheet conveyor and said belt conveyor; and means for guiding said flexible sheet conveyor, said means for guiding having a first position wherein a width of said flexible sheet conveyor substantially equals said width of said flexible sheet, said means for guiding having a second position wherein said width of said flexible sheet conveyor is less than said width of said flexible sheet, said second position being along a portion of said lower run where said flexible sheet contacts said products to slacken said flexible sheet, whereby brine can fill said slackened flexible sheet.

2. The apparatus of claim 1, wherein said guide means comprise:

rod-like guide rails on lateral sides of said flexible sheet conveyor and fixed to one of said flexible sheet and a support;

adapters fixed to the other of said flexible sheet and support and shaped to slidingly engage said guide rails; and bearing means between said guide rails and adapters.

3. The continuous freezing apparatus according to claim 2, wherein said bearing means comprise linear bearings.

4. The continuous freezing apparatus according to claim 2, wherein a sliding surface of each of said adapters is constituted by a material having a small coefficient of friction.

5. The continuous freezing apparatus according to claim 2, wherein said adapters are made of synthetic resinous material.

6. The continuous freezing apparatus according to claim 7, wherein a rotating shaft of at least one roller of said roller chain is arranged perpendicular to the rotating shaft of another roller of said roller chain.

7. The apparatus of claim 1, wherein said guide means comprise:

channel shaped guide rails on lateral sides of said flexible sheet conveyor and fixed to a support; and a roller chain, including rollers, in each of said guide rails and fixed to said flexible sheet.

* * * * *